United States Patent [19]
Johnston

[11] 3,762,062
[45] Oct. 2, 1973

[54] TWIN GYRO NORTH SEEKER

[76] Inventor: James V. Johnston, 600 Madison Pike N.W., Huntsville, Ala. 35806

[22] Filed: July 20, 1971

[21] Appl. No.: 164,375

[52] U.S. Cl.......................... 33/321, 74/5.34, 33/324
[51] Int. Cl............................................. G01c 19/38
[58] Field of Search..................... 33/321, 322, 323, 33/324, 325, 326, 327; 74/5.34

[56] References Cited
UNITED STATES PATENTS

| | | | |
|---|---|---|---|
| 3,238,794 | 3/1966 | Wing | 74/5.34 |
| 1,977,615 | 10/1934 | Beers | 33/361 |
| 3,231,984 | 2/1966 | Howe et al. | 33/324 |
| 2,729,107 | 1/1956 | Braddon | 33/321 X |
| 1,895,628 | 1/1933 | Anschutz-Kaempfe | 33/321 |

Primary Examiner—Robert B. Hull
Attorney—Harry M. Saragovitz et al.

[57] ABSTRACT

A north-seeking system having a pair of integrating gyroscopes with input and output axes in respectively parallel and normal relation to a horizontal plate and corresponding pickoffs at equal oblique angles with a selected plate diameter. Respective pickoff amplifiers are connected to a summer for statistically average operation of a servo motor to rotate the selected diameter for universal terrestrial orientation of the selected diameter to the North-South meridian.

3 Claims, 3 Drawing Figures

PATENTED OCT 2 1973　　　　　　　　　3,762,062

James V. Johnston,
INVENTOR

PATENTED OCT 2 1973 3,762,062

James V. Johnston,
INVENTOR

TWIN GYRO NORTH SEEKER

BACKGROUND OF THE INVENTION

Present north-seeking gyroscope systems require separate damping devices for slowing the gyro to reduce overshoot and secure rapid alignment as precession brings the gyro to the North-South meridian. Some devices include velocity sensors or tachometer generators on the vertical axis of a gyro connected to torquing coils to retard motion of the gyro. Other systems including some inertial navigation platforms employ accelerometers responsive to tilt around the gyro East-West axis to dampen the gyro. Pendulous type ship's gyro compasses may use heavy viscous fluid within a pipe having an intermediate orifice restrictor to restrict transfer of fluid between ends of the pipe.

The precessional force produced by a gyro requires latitude adjustment for accurate North-South orientation. The damping forces of the foregoing devices include compromises of many factors and none of the damping forces can be optimized for unmodified use of the systems over the entire surface of the earth.

SUMMARY OF THE INVENTION

The system herein described includes a pair of gyroscopes provided with pickoffs and matched to respond identically to the precession torque rate at any point on the earth. The gyroscopes are mounted at identical acute angles with the indicator diameter of a horizontal plate for positive rotation of the plate with mutual damping. The outputs of corresponding pickoffs are each connected to amplifiers and the outputs thereof are electrically summed for statistically average operation of the gyros to provide rapid indication of bearing in the system. The gyroscope rotors are oppositely wound for stability of meridian indication.

DESCRIPTION OF THE PREFERRED EMBODIMENT

Figure 1:
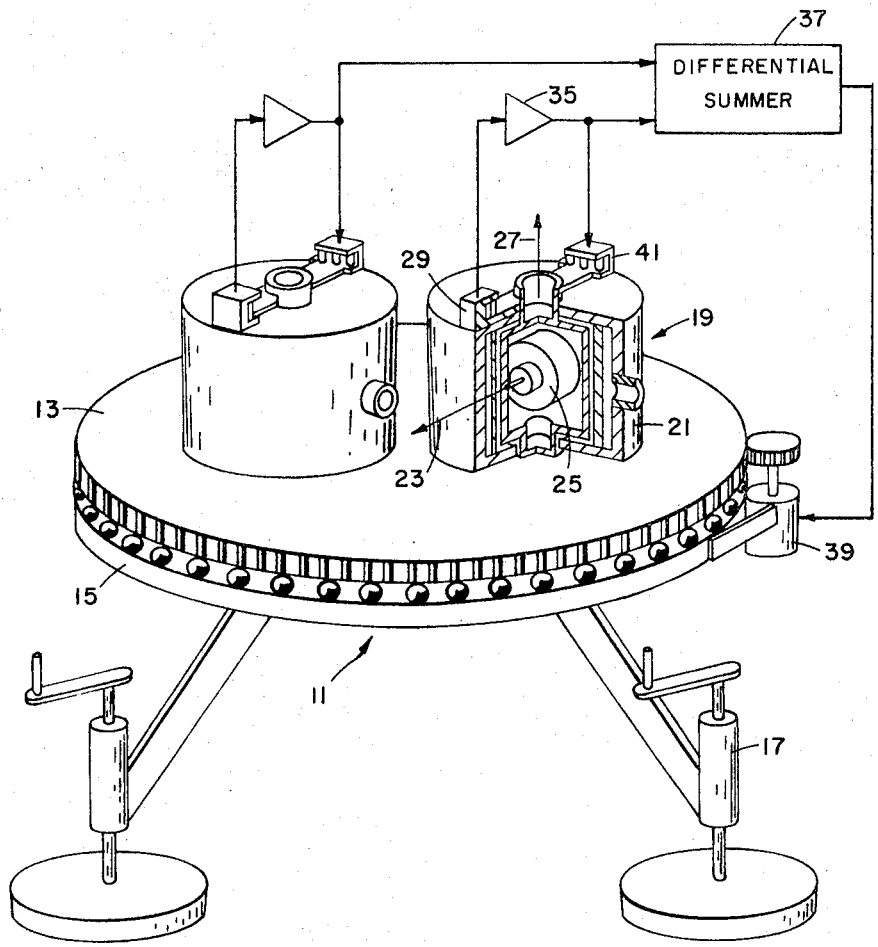
FIG. 1 is a partially cutaway perspective view of the indicator of the system.
Figure 3:
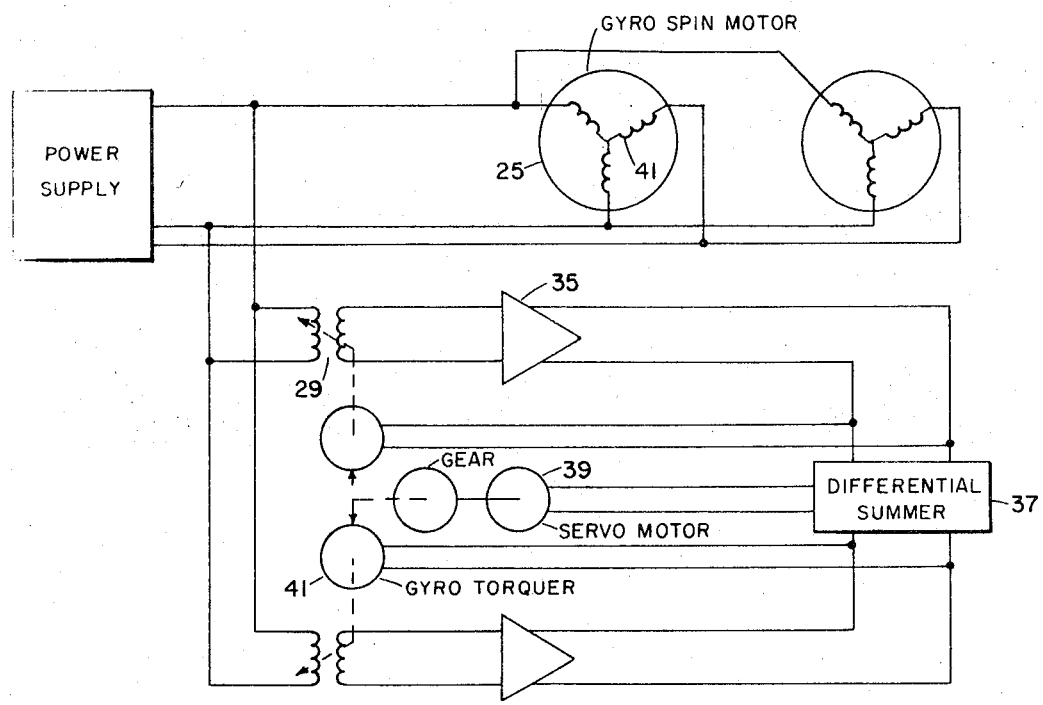
FIG. 3 is a wiring diagram of the system.
Figure 2:
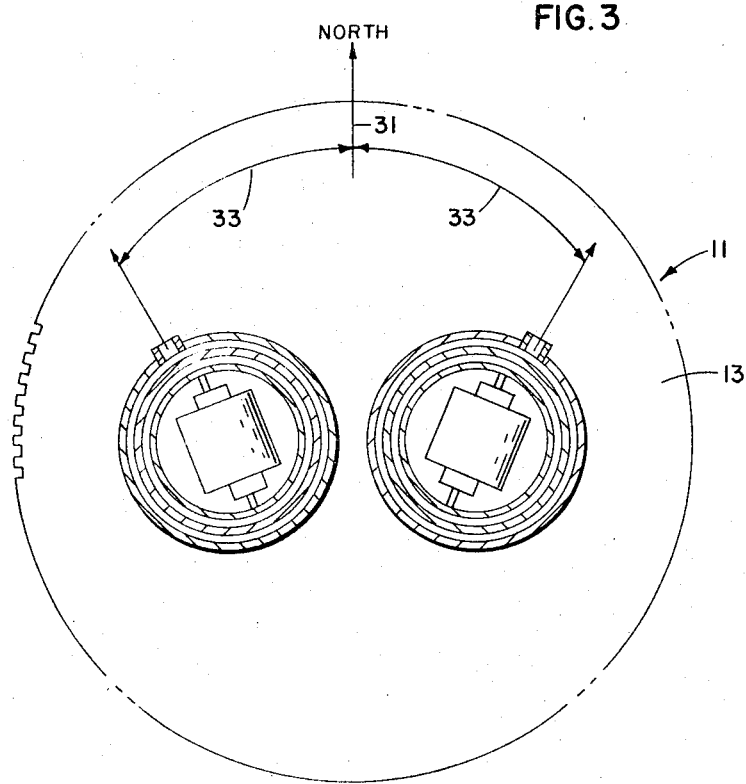
FIG. 2 is a partially cutaway plane view of the indicator.

A north-seeker 11 is provided with a plate 13 constituting a support member rotatable about an axis on a base 15. Plate 13 is adjusted to make the rotation axis vertical by level screws 17 on base 15 (horizontal indicator not shown). A gyroscopic assembly is provided with a pair of gyroscopes 19 having stators 21 mounted on plate 13 with the spin axes 23 and output axes 27 of rotors 25 of the gyros respectively parallel and normal to plate 13. Pickoff coils 29 on stators 21 are disposed at equal and opposite acute angles 33 to meridian indicator 31 on plate 13 for pointing the direction of geodetic north (the tangent to the earth in the North-South meridian). The value of angle 33 is not critical (substantially 4.5° for gyroscopes with angular momentum of 1 million gramcentimeter squared per second).

Pickoff coils 29 sense rotation of each of rotors 25 around the corresponding output axes 27 responsive to precession of the gyros and are connected through respective matching amplifiers 35 and differential summer 37 to a servo motor 39 geared to rotate plate 13. Amplifiers 35 are also connected to corresponding torquers 41 to limit rotation of rotors 25 relative to stators 21 in proportion to the induced pickoff coil signals.

When indicator 31 is displaced with both gyros on the same side of the North-South meridian, summer 37 adds the amplified displacement signals for rapid rotation of indicator 31 towards the North-South meridian. The signals reduce as the gyroscopes approach the North-South meridian to slow rotation of plate 13.

As the lead gyroscope rotates beyond the North-South meridian the signal increases in the opposite direction from zero to dampen the signal from the following gyroscope until the signals equalize and indicator 31 comes to rest without oscillation at the North-South meridian with spin axes 23 at equal and opposite angles to indicator 31.

All of the parts of gyroscopes 19 except the windings are matched to provide equal performance at any point on the earth's surface. The windings 41 of rotors 25 are reverse connected to nullify oscillatory effects of extraneous torques about the East-West axis of plate 13 such as the pitch of a ship when indicator 31 is at the North-South meridian.

I claim:

1. A north-seeking system for terrestrial operation comprising:
   a. a base;
   b. a support member mounted thereon for rotation about an axis of said base, with said base having means for adjusting it to verticalize said axis;
   c. a servo motor mounted on the base for rotating said support member about said axis;
   d. a gyrosopic assembly including a pair of gyroscopes each having an input axis and an output axis and a precession pickoff and secured to said support member with said input and output axes in normal and codirectional relation respectively with said first-named axis, and with said pickoffs so positioned that at a null condition of both, the spin axes of the respective gyroscopes are at a substantial azimuthal angle to each other;
   e. a differential summer connected to said pickoffs and to said servo motor to rotate said support member to an azimuth position at which the summer output is at a null; and
   f. an indicator fixed to said support member and directed along the bisector of said azimuthal angle for meridian indication.

2. A north-seeking system as in claim 1 including amplifiers and demodulators serially connected between said precession pickoffs and said differential summer.

3. A north-seeking system as in claim 2 for operation with extraneous torques applied around said East-West axis, said gyroscopes being provided with oppositely wound rotor windings to provide stability to said indicator at the meridian.

* * * * *